United States Patent
Annecke

[19]

[11] Patent Number: 6,000,961
[45] Date of Patent: Dec. 14, 1999

[54] ELECTRICAL CONNECTOR

[75] Inventor: Alfred Annecke, Flein, Germany

[73] Assignee: Amphenol-Tuchel Electronics GmbH, Heilbronn, Germany

[21] Appl. No.: 08/936,420

[22] Filed: Sep. 24, 1997

[30] Foreign Application Priority Data

Sep. 26, 1996 [DE] Germany .................. 196 39 532

[51] Int. Cl.$^6$ .................................................. H01R 13/627
[52] U.S. Cl. ............................................................. 439/350
[58] Field of Search ................................ 439/188, 350–8

[56] References Cited

U.S. PATENT DOCUMENTS

| 5,167,518 | 12/1992 | Deacon | 439/188 |
| 5,613,865 | 3/1997 | Dullin et al. | 439/188 |

FOREIGN PATENT DOCUMENTS

| 0 591 948 | 4/1994 | European Pat. Off. | H01R 13/639 |
| 1 195 842 | 7/1965 | Germany | H01R 13/73 |
| 43 17 344 | 12/1994 | Germany | H01R 13/62 |
| 44 30 358 | 4/1995 | Germany | B60R 21/16 |

OTHER PUBLICATIONS

U.S. application No. 08/065,532, Bauerle et al., filed May 21, 1993.
U.S. application No. 08/622,875, Dullin, filed Mar. 29, 1996.
U.S. application No. 08/713,359, Baumann, filed Sep. 13, 1996.

*Primary Examiner*—Lincoln Donovan
*Assistant Examiner*—Eugene G. Byrd
*Attorney, Agent, or Firm*—Bacon & Thomas

[57] ABSTRACT

An electrical connector is arranged to be connected to an associated element and disposed together with the associated element within a hollow body. Radially extending tongues having detents are formed on the shell of the connector, the tongues being bent at an approximately 90° angle during insertion of the connector and associated element into the hollow body to retain the connector and associated element within the hollow body. The associated element may be the generator and of a vehicle airbag system, and the hollow body may be a steering column of the vehicle.

9 Claims, 1 Drawing Sheet

ELECTRICAL CONNECTOR

BACKGROUND OF THE INVENTION

The invention concerns an electrical connector arranged to be connected to an associated component and disposed together with the associated component within a hollow body.

In particular, the invention concerns an electrical connector which is connectable to a generator (a receptacle) and an electrical control unit and is disposed, together with the generator, within a steering column of a motor vehicle, as a component of an inflatable retaining system (airbag)

Such a connector is known from the EP 0 591 948 A2. It has a very limited size (for example, length: 2 to 3 cm, width: about 1 cm, height: 0,1 to 1,0 cm).

As a component of a safety system, the connector must be able to be fabricated securely on the generator and must not loosen accidentally. Apart from the electrical plug-in connection to the receptacle (primary locking), there are different types of secondary locking of the connector.

In EP 0 591 948 A2, a separate locking member is proposed, which is mounted after a connection has been established.

DE 43 17 344 A1 and DE 44 30 358 A1 describe other types of separate locking components (secondary locking) of electrical connectors of a generic type.

SUMMARY OF THE INVENTION

It is an object of the invention to provide a connector with secondary locking, wherein further functions can be performed via the secondary locking means.

While the prior art secondary locking is performed mainly in the region of the plug-type connection of the connector to the generator, the teaching according to the invention dissociates from connector-to-generator plug-in region and provides the possibility of a locally separated locking with the associated generator via tongues hinged to the connector (connector shell), partly by using the hollow body (steering column) as abutment for the catching means.

The invention in its most general embodiment concerns an electrical connector arranged to be connected to an associated component and disposed together with the associated component within a hollow body, having the following features:

at least two tongues project radially from the connector, detents project from the tongues, the tongues are formed to be flexible between the detents and the connecting region to the connector.

In order to position the connector within a steering column after connecting it to an associated generator, the structural unit of connector and generator is inserted into the steering column from one end, the radially projecting tongues being bent at about 90° by the wall of the steering column so that detents projecting from the tongues can be carried along parallel to the direction of insertion and be introduced into corresponding catch openings.

Preferably, these catch openings are disposed in the circumferential region of the generator so that the secondary locking is effective between the connector and generator. In this case, the detents (projections) are oriented towards the plug-in termination of the connector (the primary locking). In inserting the structural unit of connector and generator, the detents in their final position are oriented perpendicularly to the steering column and project into the corresponding openings of the generator with their free end, the tongues abutting the inner wall of the steering column, so that secure catching of the detents in the openings of the generator is effected.

At the same time, the tongues perform a kind of centering and adjusting function for the connector within the steering column, so that tolerances in the floating mounting of the connector within the steering column can be compensated.

A rotationally symmetrical arrangement of the tongues on the connector (shell) optimizes the described centering and adjusting function.

The arrangement of three tongues in total at an angle of about 120° with respect to each other is structurally simple and effective.

Because of the restricted spatial conditions within the steering column, the bending of the tongues with respect to the connector shell is usually effected directly in the connecting region. In order to form a radius of curvature which is as small as possible, the tongues may, according to an embodiment of the invention, be made flexible along a hinge region.

Due to the small size of the connector (shell) consisting of an insulating material, usually synthetic material, described at the beginning, another embodiment provides that the hinge region is formed as a film hinge, essentially by a weakening of material.

It is known to form a two-piece connector shell, in order to connect cables or to dispose electrical elements. Here, that also may be carried out. The safety of the catching of the upper and lower part of the shell may be improved in a connector according to the invention by hinging the tongues to the portion of the upper part of the shell that is opposite to the associated generator. In this way, the upper part of the shell is fixed additionally against the lower part of the shell and thus against the receptacle by the tongues and the detents.

In having a simple structral design, the described connector meets high safety requirements and, in addition, makes possible improved positioning of the associated element within a hollow space, like the steering column of a motor vehicle.

Further characteristics of the invention follow from the features of the subclaims and the other application documents.

Figure 2:
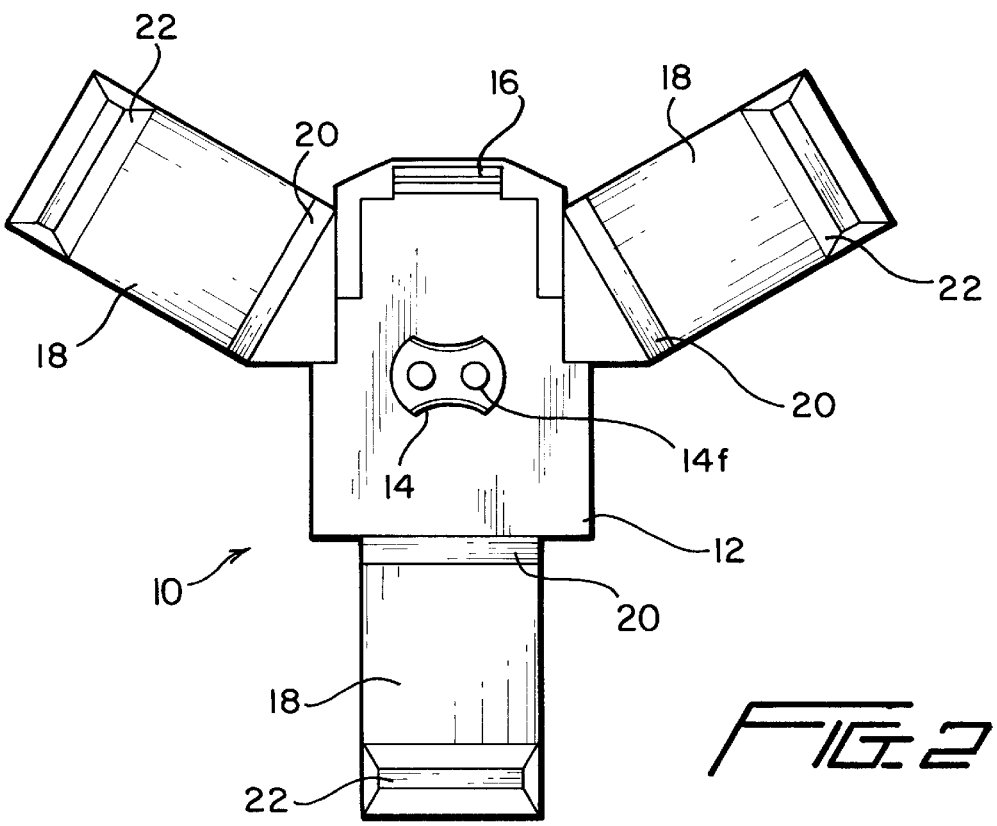
FIG. 2 shows a plan view of the connecting end region of the connector according to FIG. 1.

The connector 10 illustrated in FIG. 2 comprises a shell 12 having a plug-in termination 14 projecting perpendicularly, a cable outlet 16 parallel to the plug-in termination, and three tongues 18 hinged to the upper part of the shell 12 at an angle of about 120° with respect to each other. In the connecting region of the shell 12 to the tongues 18, a weakening of material is located respectively for forming a film hinge 20 which makes the bending of the tongues 18 with respect to the shell 12 possible.

A detent 22 projects perpendicularly from the lower surface of each tongue 18.

In the illustration of FIG. 2, the detents 22 project from the tongues 18 in the same direction as the plug-in termination 14 of the shell 12 (lower part of the shell).

Figure 1:
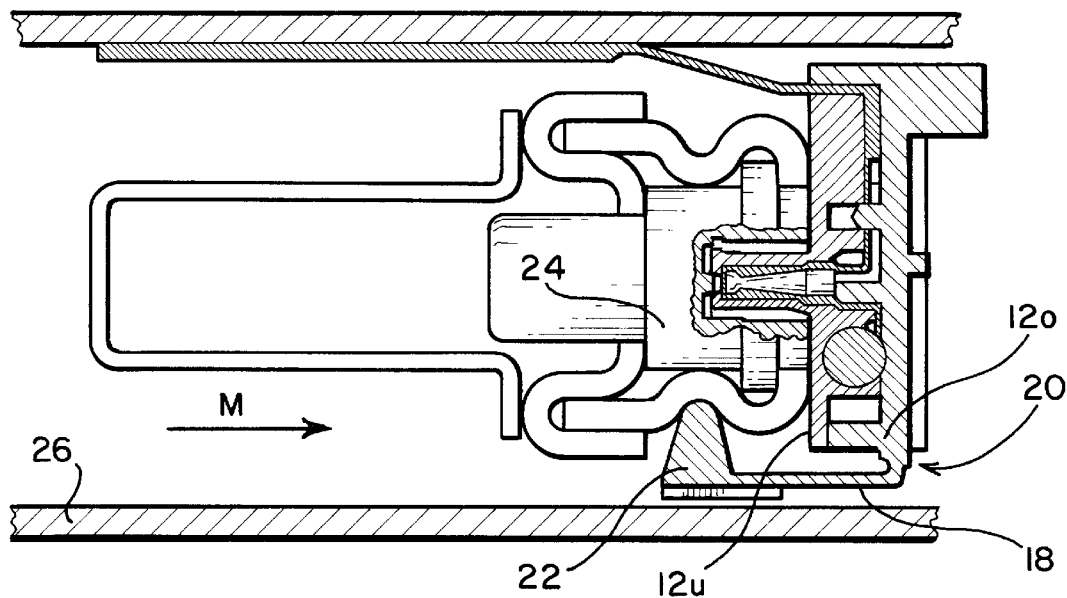
FIG. 1 shows a longitudinal section of the steering column of a motor vehicle with an inserted connector and associated generator.

FIG. 1 shows the arrangement of the connector of FIG. 2 in connection with an associated generator 24 after positioning within the steering column 26 of a motor vehicle.

First of all, the connector 10 with its contact springs 14*f* of the plug-in termination 14 is put onto the associated contact pins of the generator 24.

Then, the structural unit of connector 10 and generator 24 is inserted into the steering column 26 in the direction of the arrow M. At this time, the tongues 18 abut against the wall of the steering column 26 and are bent off at about 90° along the film hinges 20 to the position illustrated in FIG. 1, detents 22 at the ends being inserted into corresponding circumferential indents 28 in the generator 24 at the same time.

This position characterizes the mounting position, the detents 22 lying in the indents 28 and having rear ends that abut against the inner wall of the steering column 26 providing a degree of deformability and thus adjustability and compensation of tolerances within the steering column due to the elasticity of the synthetic material of the tongues 18 and the detents 22.

FIG. 1 shows that the tongues are hinged to the upper part 12*o* of the shell and thus, in the mounting position (locking position), the upper part 12*o* of the shell is pressed against the lower part 12*u* of the shell at the same time.

The illustration of FIG. 1 shows at the same time that the connector 10 can be detached from the generator 24 only by removal of the combination of connector 10 and generator 24 from the steering column 26.

I claim:

1. An electrical connector arranged to be electrically connected to an associated component and disposed together with the associated component within a hollow body, comprising:

at least two tongues arranged to project radially outwardly from a main body of the connector, said tongues being connected to the connector at connecting regions; and detents arranged to project perpendicularly inwardly from the tongues, wherein the tongues include flexible sections situated between the detents and the connecting regions, said tongues thereby being capable of being bent at an angle of approximately 90° so as to extend in an insertion direction as the connector and associated component are inserted together into the hollow sleeve, said detents being arranged to extend inwardly and engage said associated component upon bending with rear sections of said detents engaging said hollow sleeve in order to prevent separation of said connector and said associated component during and following insertion together into said hollow sleeve.

2. An electrical connector as claimed in claim 1, wherein the tongues are arranged in a rotationally symmetrical manner.

3. An electrical connector as claimed in claim 1, wherein said at least two tongues includes three tongues extending at an angle of about 120° with respect to each other.

4. An electrical connector as claimed in claim 1, wherein the tongues are flexible along a hinge region.

5. An electrical connector as claimed in claim 4, wherein the hinge region (20) is a film hinge.

6. An electrical connector as claimed in claim 1, further comprising a two-piece shell, the tongues being hinged to a part of said shell situated opposite to the associated component.

7. An electrical connector as claimed in claim 1, wherein the detents (22) project from the tongues towards a plug-in termination of the connector.

8. An electrical connector as claimed in claim 1, wherein the tongues are connected to the connector by weakening of material to form said hinges.

9. An electrical connector as claimed in claim 1, further comprising a cable guide arranged such that a cable coming out of a connector shell extends towards the associated component.

* * * * *